United States Patent
Coak et al.

(10) Patent No.: US 7,267,302 B2
(45) Date of Patent: Sep. 11, 2007

(54) WINDOW AIRFLOW DAMPER

(75) Inventors: Craig E. Coak, Kenmore, WA (US); Joel E. Hansen, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 140 days.

(21) Appl. No.: 11/092,040

(22) Filed: Mar. 29, 2005

(65) Prior Publication Data

US 2006/0219844 A1   Oct. 5, 2006

(51) Int. Cl.
 *B64C 1/14* (2006.01)
(52) U.S. Cl. .................................... 244/129.3
(58) Field of Classification Search ............. 244/129.3, 244/121, 129.1, 119, 129.4; 52/204, 209, 52/593, 786.1, 788.1, 786.12, 171.2; 417/540; 454/198, 156, 212, 82, 81; 49/504, 47
See application file for complete search history.

(56) References Cited

U.S. PATENT DOCUMENTS

| | | | | |
|---|---|---|---|---|
| 5,516,266 A | * | 5/1996 | Talaski | 417/540 |
| 5,884,865 A | * | 3/1999 | Scherer et al. | 244/129.3 |
| 5,955,707 A | * | 9/1999 | Fritz | 181/282 |
| 5,988,566 A | * | 11/1999 | Meyer | 244/129.3 |
| 6,168,112 B1 | * | 1/2001 | Mueller et al. | 244/129.3 |
| 6,450,451 B1 | * | 9/2002 | Godfrey et al. | 244/129.3 |

FOREIGN PATENT DOCUMENTS

| | | |
|---|---|---|
| DE | 1659769 | 10/1969 |
| EP | 0753640 | 1/1997 |
| GB | 2313871 | 12/1997 |

* cited by examiner

*Primary Examiner*—Tien Dinh
(74) *Attorney, Agent, or Firm*—Klein, O'Neill & Singh, LLP

(57) ABSTRACT

A device that alters the breather hole configuration currently being employed in aircraft window assemblies. The device provides a means to allow slow moving air to pass and breathe through the breather hole, while stopping or significantly blocking non-steady air pulses from passing through. The device uses a combination of the cross-section and length of the air path that determines the effectiveness of the particular device to dampen out any unsteady airflow pulses.

10 Claims, 3 Drawing Sheets

WINDOW AIRFLOW DAMPER

BACKGROUND

1. Field of the Invention

This invention relates generally to aircraft windows and specifically the prevention of the fogging of windows.

2. Background of the Invention

Throughout the history of commercial aviation, airlines have experienced the severe fogging, or the formation of condensation, on passenger windows on their aircraft.

There are numerous potential causes of fogging on passenger windows. One such cause seems to be related to breather holes found on aircraft windows. As shown in FIGS. 1A and 1B, window assembly 100 has a breather hole or vent hole 102, usually located on the inner pane of window assembly 100. Breather hole 102 is typically designed to equalize pressure in cavity 104 between two structural window panes 106 and 108 in response to the pressure changes inside the aircraft cabin.

During normal operation of the aircraft, the vibration of window assembly 100 causes window panes 106 and 108 to vibrate, which can result in air pulsing in and out of breather hole 102. This pulsing air can carry unintended moist cabin air into window assembly 100 causing an undesirable fogging of the window. Testing of windows in the lab confirms that this pulsing of air can occur at typical aircraft vibration levels and can directly contribute to the window fogging.

Accordingly, what is needed is a device that allows slow moving air to pass and equalize pressure in the cavity, while preventing or significantly reducing the passage of the pulsing or non-steady air.

SUMMARY OF THE INVENTION

The present invention is a device that alters the breathing hole configuration currently being employed in aircraft window assemblies.

The device provides an inexpensive means to allow slow moving air to pass through the breathing hole, while stopping or significantly blocking non-steady air pulses from passing through. The present invention incorporates a unique combination of the cross-section and length of the air path that determines the effectiveness of the particular device to dampen out any unsteady airflow pulses.

In one aspect of the present invention, a device is provided for dampening airflow through a breather hole in an aircraft window assembly. The device includes an airflow path defined within the device. The airflow path is configured to dampen out a particular frequency range and magnitude of incoming airflow to allow slow moving air to pass, while substantially blocking non-steady air from passing through.

In another aspect of the invention, an aircraft window assembly is provided including a first window pane, a second window pane and a breather hole defined at a specified location through the first window pane. The assembly also includes an airflow damping device positioned adjacent the breather hole. The damping device defines an airflow path configured to dampen out a particular frequency range and magnitude of incoming airflow.

In yet another aspect of the invention, a window assembly is provided including at least one window pane, having a breather hole capable of receiving incoming airflow; and a means for dampening a particular frequency and magnitude of the incoming airflow.

The device of the present invention represents an improvement to the "state-of-the-art" window assembly that has been used in aircraft since 1969 as one of the lightest and least expensive passenger windows in any commercial airplane. The incorporation of this invention can provide improved customer satisfaction and reduce maintenance costs, caused due to regular replacement of current parts made necessary by severe window fogging.

Additional advantages, objects, and features of the invention will be set forth in part in the detailed description which follows. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The accompanying drawings are included to provide further understanding of the invention, illustrate various embodiments of the invention, and together with the description serve to explain the principles and operation of the invention. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Figure 1A:
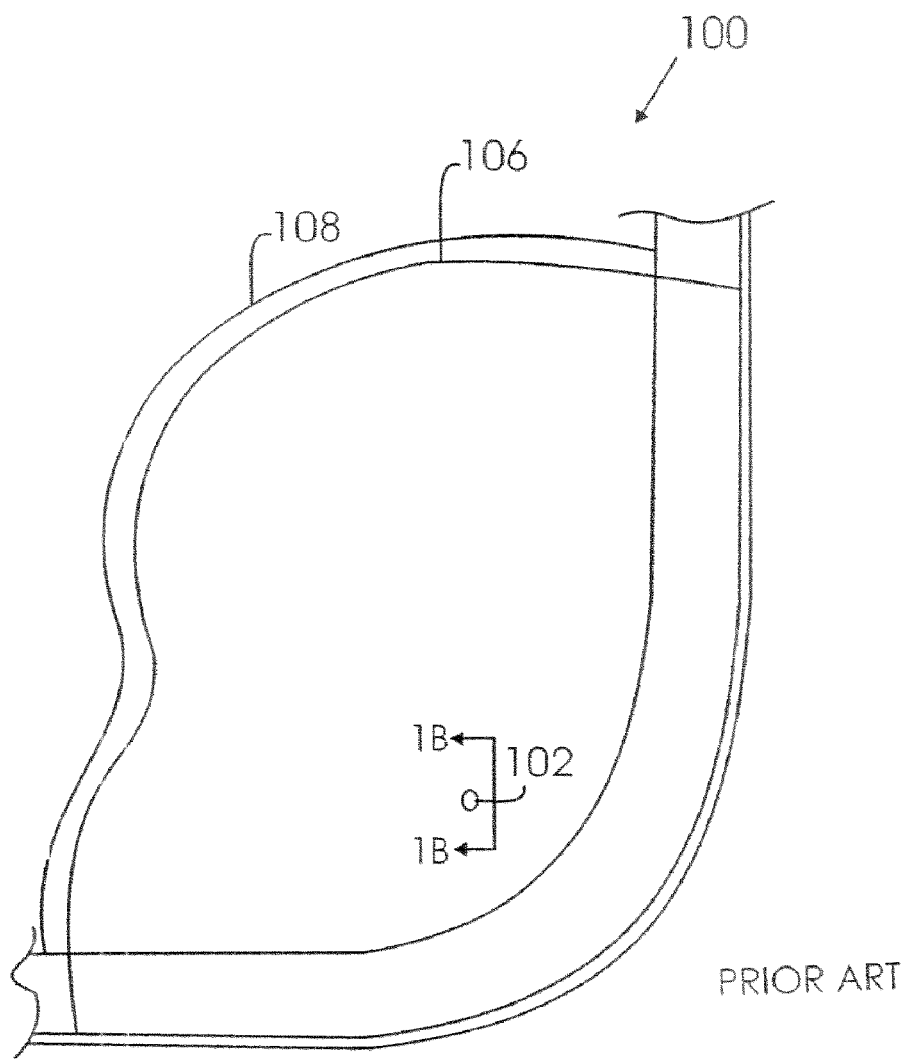
FIGS. 1A and 1B are simplified front and cross-sectional views of a typical aircraft window having a vent hole.
Figure 1B:
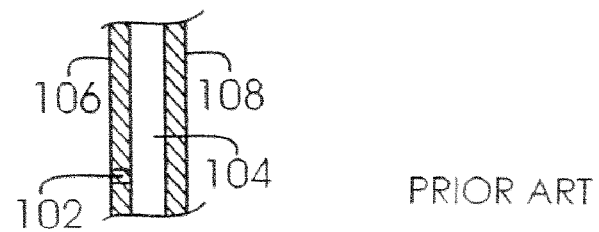

Referring to FIGS. 1A and 1B, it is known that a breather or vent hole 102 is provided in an aircraft window assembly 100 to allow window assembly 100 to breath with pressurization changes in an airplane cabin. It is also known that the air cavity can be excited by vibration, at a frequency range that causes the air to pulse in and out of the breather hole which can result in additional moist cabin air being introduced into the window cavity and directly result in fogging of the window panes.

Figure 2:
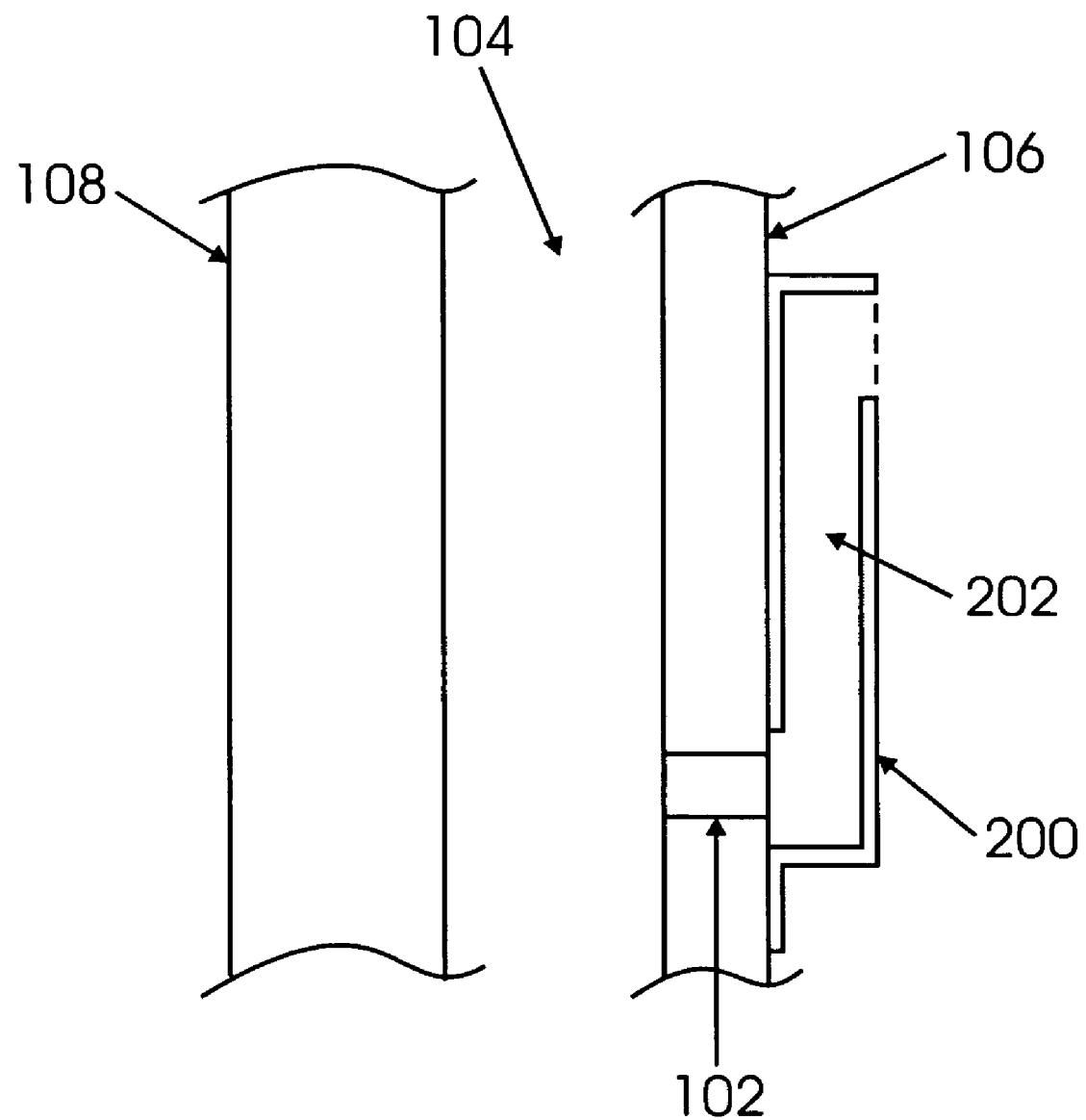
FIG. 2 is a simplified view of an airflow damper in accordance with an embodiment of the present invention.

FIG. 2 is a simplified view of an airflow damper 200 in accordance with an embodiment of the present invention. Airflow damper 200 defines a space or a secondary air path 202, which is positioned adjacent to breather hole 102 on a passenger airplane window assembly 100. Secondary air path 202 provides a secondary volume of air directly adjacent to breather hole 102, into which the air pulses are directed. Secondary air path 202 allows slow moving air to pass and breathe, while stopping or significantly blocking non-steady air pulses from attempting to pass through breather hole 102.

The invention incorporates the unique combination of the cross-sectional area and length of the secondary air path 202 that determines the effectiveness of the particular device to dampen out any unsteady airflow pulses. Based upon the specific frequency range and magnitude of the air pulse that needs to be blocked, the cross-sectional area and length of the secondary air path can be varied.

Accordingly, secondary air path 202 can be designed with a cross-sectional area and length that is specifically sized such that it will dampen out a particular frequency and magnitude of the incoming air pulse to allow slow moving air to pass and breathe in the window, while stopping or significantly blocking non-steady air pulses from passing through. Secondary air path 202, thus, is a "tuned air path."

In one embodiment, tuned secondary air path 202 can be made to have a cross-sectional area of between about 0.007 in$^2$ and 0.015 in$^2$ and a length of between about 2.5 in and 6.0 in.

Air damper 200 can be made of any suitable material, such as molded plastic, a rubber compound and the like.

Figure 3A:
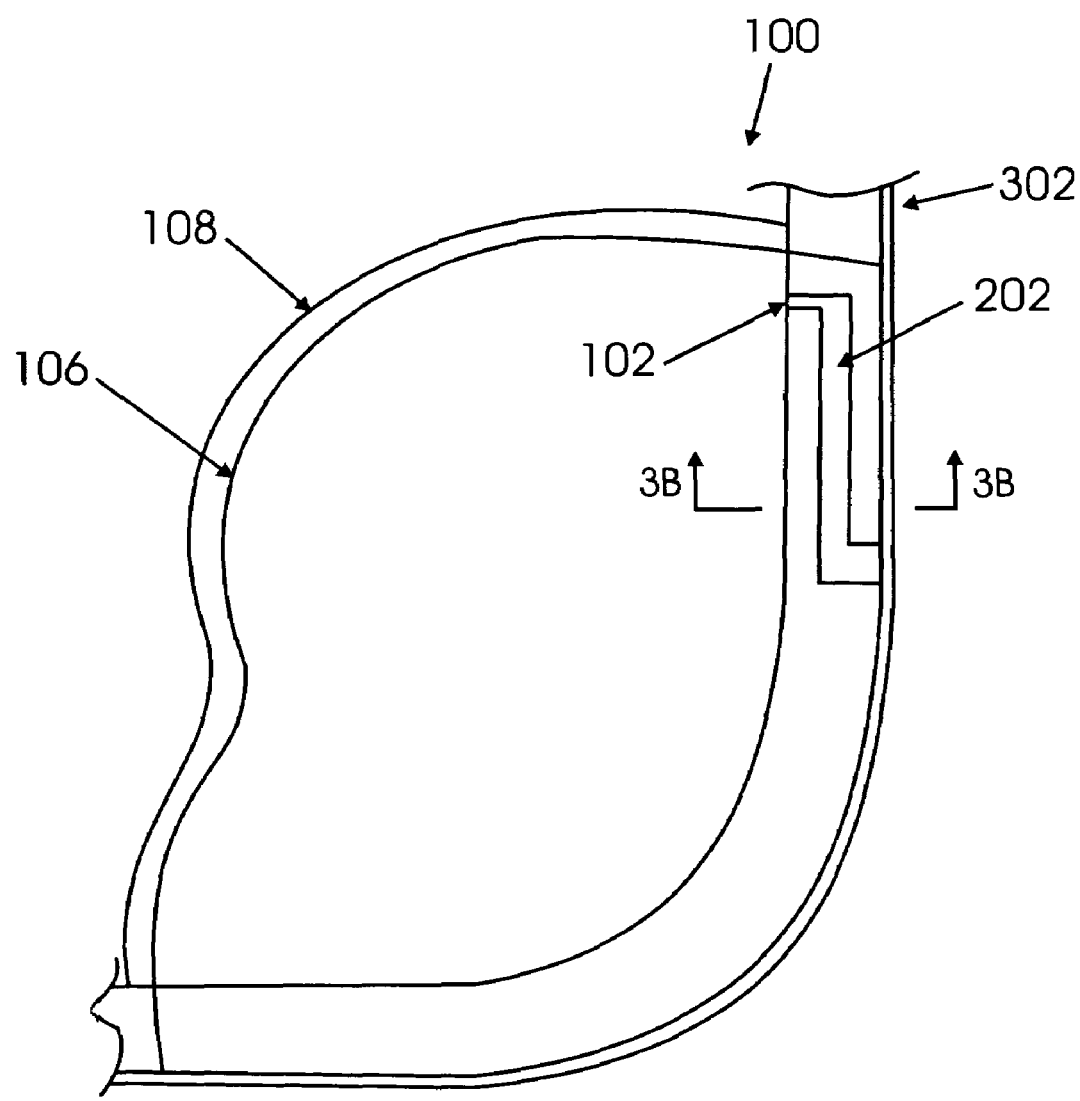
FIGS. 3A and 3B are simplified illustrations of an alternative embodiment of the present invention.
Figure 3B:
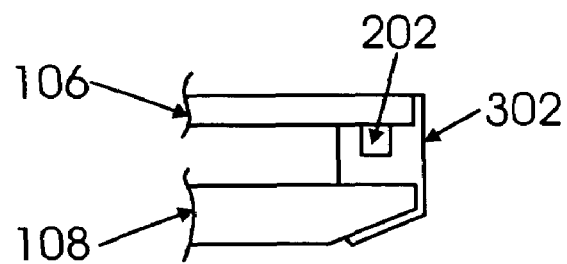

In another embodiment, shown in FIGS. 3A and 3B, breather hole 102 and the secondary tuned air path 202 can be formed directly into seal or edging 302 of window assembly 100.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An aircraft window assembly, comprising:
   a window including a breather hole defined at a specified location through said window; and
   a damping device having a first opening positioned over said breather hole, said damping device defining an airflow path to receive airflow passing through said breather hole into said first opening and to provide a volume of stagnant air disposed over said breather hole to dampen out a particular frequency range and magnitude of airflow passing through said breather hole.

2. The assembly of claim 1, wherein said airflow path is configured to allow slow moving air to pass, while substantially blocking non-steady air from passing through.

3. The assembly of claim 1, wherein said damping device is made from a material taken from the group consisting of molded plastic and rubber.

4. The assembly of claim 1, wherein said airflow path has a cross-sectional area of between about 0.007 in$^2$ and 0.015 in$^2$.

5. The assembly of claim 1, wherein said airflow path has a length of between about 2.5-inch and 6.0-in.

6. The assembly of claim 1, wherein said airflow is vibration induced.

7. The assembly of claim 1, wherein the damping device comprises a second opening offset from the first opening.

8. The assembly of claim 7, wherein the airflow path defined by the damping device extends generally transverse to the first and second openings such that air passing through the path makes two turns.

9. The assembly of claim 1, wherein the airflow path defined by the damping device extends adjacent the window and in a direction generally parallel with the window.

10. An aircraft window assembly, comprising:
    a window including a breather hole defined at a specified location through said window; and
    a damping device having a first opening positioned over said breather hole, said damping device defining an airflow path to receive airflow passing through said breather hole into said first opening and to provide a volume of stagnant air disposed over said breather hole to dampen out a particular frequency range and magnitude of airflow passing through said breather hole,
    said breather hole extends perpendicular through said window to cause said airflow passing through said breather hole to flow substantially perpendicular relative to said window.

* * * * *